Patented Mar. 17, 1925.

1,529,891

UNITED STATES PATENT OFFICE.

CARL IMMERHEISER AND BODO ZSCHIMMER, OF LUDWIGSHAFEN-ON-THE-RHINE, GERMANY, ASSIGNORS TO BADISCHE ANILIN- & SODA-FABRIK, OF LUDWIG-SHAFEN-ON-THE-RHINE, GERMANY, A CORPORATION OF GERMANY.

PRODUCTION OF PIGMENT COLORS.

No Drawing.   Application filed August 25, 1921.   Serial No. 495,348.

*To all whom it may concern:*

Be it known that we, CARL IMMERHEISER and BODO ZSCHIMMER, citizens of Germany, residing at Ludwigshafen-on-the-Rhine, Germany, have invented new and useful Improvements in the Production of Pigment Colors, of which the following is a specification.

Our present invention relates to the production in a new form of iron compounds of nitroso-beta-naphthol characterized by a valuable brilliant shade, good body and excellent fastness and which can be advantageously employed for various purposes.

According to our present invention, the new form of the said compounds can be obtained by treating nitroso-beta-naphthol preferably its bisulfite compound, with ferric oxid salts. The formation of the green pigment color may be effected in the absence, but preferably in the presence, of Turkey red oil, or other substances may be added which act in a similar manner, the formation taking place at ordinary, or elevated, temperature. We have further found that ferrous oxid salts can also be used for the production of very valuable shades of pigment colors, if such salts be employed in less quantity than would correspond to the usual formula (two molecular proportions of nitroso-beta-naphthol to each atom of iron), preferably in about two thirds of that quantity. In this case the reaction is also advantageously carried out in the presence of Turkey red oil or other similarly acting compounds. In the case of pyroligneous iron liquor, however, the full ratio of ferrous salt also yields good result.

In every case the preparation of the pigment color may be effected in the presence, or absence, of the substrates usual in the manufacture of color lakes and the production of the pigment color can be joined with the simultaneous formation of such a substrate. The reaction is preferably carried out by the establishment of alkaline reaction, at any rate at the end of the process.

The new pigment colors, besides having a valuable brilliant green hue and an extraordinarily fine state of division, are very fast to light, water and alkalies; they are of great value (inter alia) for the manufacture of wall papers and the art of color printing and color lithography.

The following examples will further illustrate the nature of our invention which however is not limited thereto:

*Example 1.*

40 gram-molecules of alpha-nitroso-beta-naphthol are made into a paste with 26 kilograms of sodium bisulfite solution of 37–38 degrees Baumé and 100 litres of water, and dissolved by stirring; the mixture is then filtered and made up to 200 litres. The solution of 1.95 kilograms of crystallized ferric chlorid in 20 times its weight of water is added and the whole stirred for about 5 minutes, 10 kilograms of soda ash, dissolved in 90 litres of water are then added, while well stirring, whereupon the green pigment color is formed. The mixture is then diluted with the same volume of water, allowed to settle, decanted and the operation repeated, finally it is filtered and the color finished as usual.

*Example 2.*

40 gram-molecules of alpha-nitroso-beta-naphthol are dissolved by means of bisulfite solution as described in the foregoing Example 1. The filtered solution is made up to 200 litres and mixed with 3.25 kilograms of crystallized ferric chlorid, dissolved in 20 times its quantity of water and stirred for five minutes. A mixture of 5.6 kilograms of caustic soda lye of 50 degrees Baumé, diluted with 60 litres of water, and 1 kilogram of Turkey red oil F, dissolved in 10 litres of water, is then added while well stirring. The color lake produced is washed, filtered and finished as described in Example 1.

*Example 3.*

200 litres of a solution of 40 gram-molecules of alpha-nitroso-beta-napthol prepared as described in Example 1 are mixed with 19.5 kilograms of pyroligneous iron liquor of 20 degrees Baumé, while stirring, heated to about 40–50 degrees centigrade and precipitated with a mixture of 14 kilograms of calcined sodium carbonate, dissolved in 126 litres of water, and 1 kilogram of Turkey red oil F, dissolved in 9 litres of water. The pigment is worked up as described in Example 1.

*Example 4.*

A solution of 40 gram-molecules of alphanitroso-beta-napthol, prepared as described in Example 1, is mixed while stirring first with 3.6 kilograms of copperas, dissolved in 20 times its weight of water, then with 1 kilogram of Turkey red oil F, dissolved in 9 litres of water whereupon the pigment is precipitated by adding 14 kilograms of soda ash, dissolved as 1:10. The color lake is worked up as in Example 1.

The Turkey red oil may in all the above examples be replaced by curacite-sodium salt (a bile acid preparation), sodium di-isoptopyl-naphthalene-sulfonate, or similarly acting substances.

The quantity of sodium carbonate may be varied within wide limits and other alkalies may be used instead.

We claim:—

1. A new pigment color of excellent fastness to light, water and akalies representing an iron compound of alpha-nitroso-beta-naphthol not incorporated in fibre in a form in which it is characterized by a brilliant green hue.

2. The process of manufacturing an iron compound of alpha-nitroso-beta-naphthol in a form in which it is characterized by a brilliant green shade, consisting in causing nitroso-beta-naphthol to react with a ferrous salt in less quantity than would correspond to one atom of iron to each two molecular proportions of nitroso-beta-naphthol.

3. The process of manufacturing an iron compound of alpha-nitroso-beta-naphthol in a form in which it is characterized by a brilliant green shade, consisting in causing nitroso-beta-naphthol in the form of its bisulfite compound to react with a ferrous salt in less quantity than would correspond to one atom of iron to each two molecular proportions of nitroso-beta-naphthol in the presence of a substance of alkaline reaction.

4. The process of manufacturing an iron compound of alpha-nitroso-beta-naphthol in a form in which it is characterized by a brilliant green shade, consisting in causing nitroso-beta-naphthol in the form of its bisulfite compound to react with a ferrous salt in the ratio of about two thirds of an atom of iron for each two molecular proportions of nitroso-beta-naphthol in the presence of a substance of alkaline reaction.

5. The process of manufacturing an iron compound of alpha-nitroso-beta-naphthol in a form in which it is characterized by a brilliant green shade, consisting in causing nitroso-beta-naphthol in the form of its bisulfite compound to react with a ferrous salt in the ratio of about two thirds of an atom of iron for each two molecular proportions of nitroso-beta-naphthol in the presence of a substance of alkaline reaction and of a substance producing a finely divided precipitate.

6. The process of manufacturing an iron compound of alpha-nitroso-beta-naphthol in a form in which it is characterized by a brilliant green shade, consisting in causing nitroso-beta-naphthol in the form of its bisulfite compound to react with a ferrous salt in the ratio of about two thirds of an atom of iron for each two molecular proportions of nitroso-beta-naphthol in the presence of a substance of alkaline reaction and of Turkey red oil.

In testimony whereof we have hereunto set our hands.

CARL IMMERHEISER.
BODO ZSCHIMMER.